(12) United States Patent  (10) Patent No.: US 7,193,342 B2
Casey et al.  (45) Date of Patent: Mar. 20, 2007

(54) APPARATUS FOR COOLING OF ELECTRICAL DEVICES

(75) Inventors: Kent A. Casey, Washington, IL (US); Gerald P. Simmons, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 220 days.

(21) Appl. No.: 10/321,280

(22) Filed: Dec. 17, 2002

(65) Prior Publication Data

US 2004/0113500 A1  Jun. 17, 2004

(51) Int. Cl.
*H02K 9/00* (2006.01)
(52) U.S. Cl. .......................................... 310/58; 310/54
(58) Field of Classification Search ........ 310/54–60 A, 310/254, 261, 52–63
See application file for complete search history.

(56) References Cited

U.S. PATENT DOCUMENTS

| 2,482,491 | A | * | 9/1949 | Kilgore | 310/63 |
| 2,687,695 | A | * | 8/1954 | Blom et al. | 417/357 |
| 3,217,193 | A | * | 11/1965 | Rayner | 310/58 |
| 3,241,331 | A | * | 3/1966 | Endress et al. | 62/117 |
| 3,643,119 | A | * | 2/1972 | Lukens | 310/60 R |
| 3,819,965 | A | * | 6/1974 | Schoendube | 310/58 |
| 5,519,269 | A | | 5/1996 | Lindberg | |
| 6,489,697 | B1 | * | 12/2002 | Ozawa et al. | 310/54 |

FOREIGN PATENT DOCUMENTS

WO  WO 00/54394  9/2000

* cited by examiner

*Primary Examiner*—Thanh Lam
(74) *Attorney, Agent, or Firm*—William B. Heming; Steven G. Kibby; Jeffrey A. Greene

(57) ABSTRACT

Electrical devices such as motors and generators create heat as they operate. This can lead to lower performance and life. Therefore, it is important to provide cooling for such devices. This is particularly true in heavy duty applications such as earthmoving or other industries. Methods and apparatus are disclosed to provide cooling that involves the circulation of two fluids in defined pathways. Heat within a case or other enclosure for an electrical device is transferred to one fluid. Heat from the one fluid is subsequently transferred to the other fluid. In one example, this heat transfer may occur across fins for increased effectiveness. It is also preferred that the flow of fluid be closed loop so that contaminants are not introduced into the electrical device. By providing the heat transfer out of the electrical device as described, cooling is enhanced that can lead to longer lived and better performing devices.

17 Claims, 4 Drawing Sheets

APPARATUS FOR COOLING OF ELECTRICAL DEVICES

TECHNICAL FILED

The invention relates to cooling electrical devices, and more particularly to cooling devices such as motors and generators through heat transfer between two fluids.

BACKGROUND

Electrical devices can generate considerable heat as they operate. For example, the life and performance of motors and generators can be reduced because of such heat, limiting the severity applications to which they may be applied. In cases such as earthmoving or other heavy duty industrial applications, use of motors and generators can be beneficial for drive systems and other applications provided the heat is effectively managed. Of course, these severe applications typically result in more heat that must be managed. It is therefore important to provide systems to deal with the heat in a cost effective and efficient design manner.

U.S. Pat. No. 5,519,269, issued May 21, 1996, to Lindberg is an example of a method of cooling an electrical induction motor. Coolant is provided into the motor housing, directed through slots in the stator and back out the motor. Coolant needs to be kept from the gap between the rotor and stator and directed across the windings. PCT Publication PCT/US00/06309, published Sep. 14, 2000 (Gregory C Jeppesen inventor) shows another cooling system for a motor. A fluid nozzle allows compressed fluid to expand rapidly into the motor housing. Exhaust ports maintain a positive pressure differential between chambers in the motor to enhance cooling fluid flow through the motor. Thus, the invention requires a source of compressed fluid such as air.

The disclosed invention is directed to overcoming one or more of the problems set forth above.

SUMMARY OF THE INVENTION

In one embodiment of the present invention, an electrical device has a rotor and a stator positioned about the rotor. An outer wall around the stator defines a cooling chamber between the stator and outer wall. First and second fluid sources are also provided. A first circulation pathway is defined adjacent a surface of the stator for the fluid from the first source. A second circulation pathway is defined through an air gap between the stator and rotor and through the cooling chamber for the fluid from the second source.

In another embodiment of the present invention, a method of cooling an electrical device is provided. Steps include directing a first flow of fluid adjacent an outer surface of a stator and directing a second flow of fluid between the stator and a wall positioned about the stator. Another step includes transferring heat in fluid of the second flow of fluid to the fluid of the first flow of fluid.

DETAILED DESCRIPTION

Figure 1:
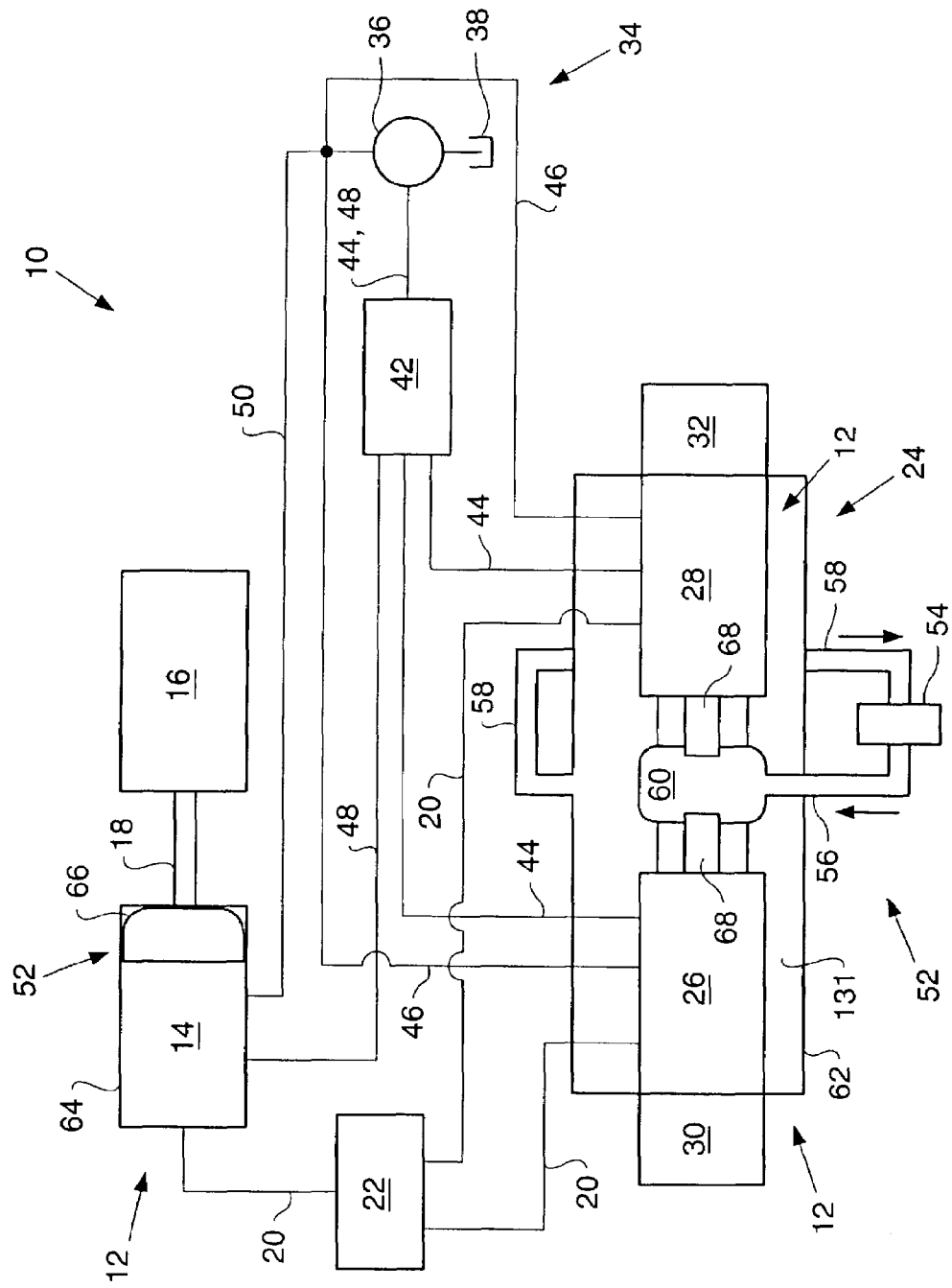
FIG. 1 is a schematic diagram showing an exemplary system having motors and a generator according to principles of the present invention.

Referring to FIG. 1, a schematic of an exemplary system 10 using principles of the present invention will first be described. The system 10 includes electrical devices 12 useful for purposes to be described. One of the electrical devices 12 is a generator 14, such as an AC generator, driven by an internal combustion engine 16 through a shaft 18 of the engine 16. The generator 14 produces electricity that is directed through lines 20 to a controller 22 and then onto a drive system 24. The drive system 24 further includes two additional electrical devices 12 which are first and second motors 26, 28, such as AC induction motors. First and second final drives 30, 32 are each associated with and driven by a respective one of the motors 26, 28. The system 10 is representative of a means for driving a vehicle or work machine (not shown). As will be appreciated, electrical energy produced by the generator 14 will power motors 26, 28 to rotate final drives 30, 32 and drive wheels (one shown in FIG. 4, reference numeral 33) connected to final drives 30, 32. The present invention is not limited to systems or applications such as described. Such systems and applications are simply used for illustration purposes.

Further referring to FIG. 1, a first source of fluid 34 is shown in this embodiment as a pump 36 and reservoir 38. The first source 34 further includes a heat exchanger 42. The pump 36 and heat exchanger 42 are shown connected through input lines 44 and output lines 46 to the drive system 24. Input line 48 and output line 50 connect the heat exchanger 42 and pump 36 to the generator 14. In the illustration shown, the fluid of the first source of fluid 34 is a liquid suitable for cooling purposes. The type of liquid will depend upon the application, but can include water, oil or an anti-freeze solution.

A second source of fluid 52 is also shown in connection with each of the electrical devices 12. The second source of fluid 52 with respect to first and second motors 26, 28 includes, for example, a blower 54 and input 56 and output 58 lines. The input line 56 connects to a manifold 60. As illustrated, the first and second motors 26, 28 and manifold 60 are positioned inside a case 62. The output line 58 opens into case 62 between the first and second motors 26, 28. With respect to the generator 14, the second source of fluid 52 is contained within a housing 64 of the generator 14. In part, the source 52 includes a fluid mover 66. The fluid of the second source of fluid 52 for both the generator 14 and motors 26,28 is preferably, as illustrated, air.

In addition, sensors 68 are schematically illustrated. These sensors 68, such as speed and rotation sensors, as is well known in the art, facilitate operation of the motors 26, 28 and final drives 30, 32 for control of the drive system 24 in driving, turning and stopping an associated machine or vehicle.

Further details of features described with respect to FIG. 1 will now be discussed with reference to the other drawings.

Figure 2:
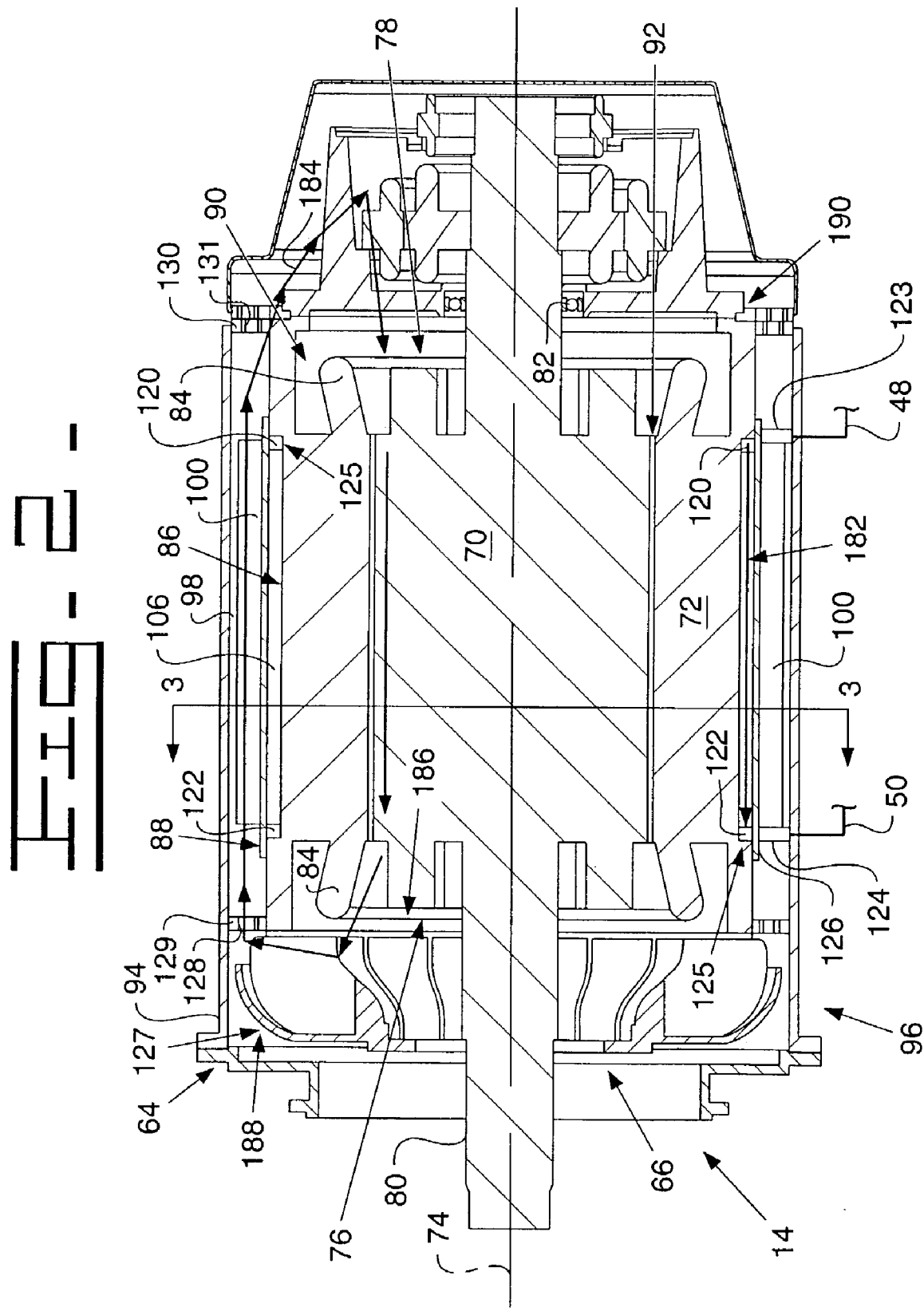
FIG. 2 is a cross-sectional view taken lengthwise through the center of the generator in FIG. 1.
Figure 3:
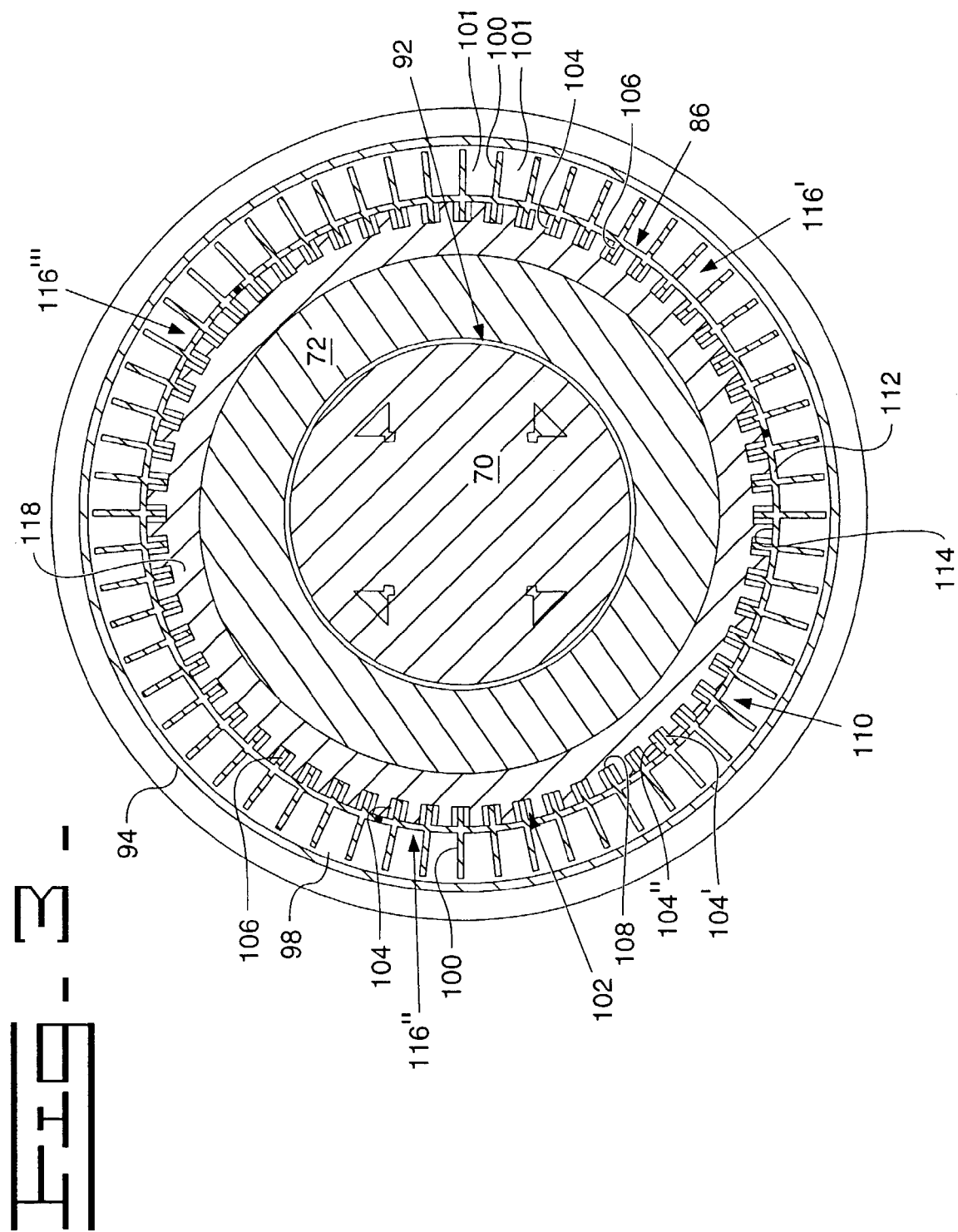
FIG. 3 is a cross-sectional view along lines 3—3 of FIG. 2.

Referring to FIGS. 2 and 3, the generator 14 is shown in greater detail. The generator 14 includes a rotor 70 and stator 72. Rotor 70 has an axis 74 about which it is rotatable and first and second opposed ends 76, 78. Rotor 70 is of known construction with a shaft 80 on bearings 82 at either of the ends 76, 78 (only the one at second end 78 shown). The rotor 70 is driven by connection with engine 16 to the shaft 80 at the first end 76 for rotation about the axis 74. Stator 72 is similarly of known construction. Typically the rotor 70 and stator 72 will each have a plurality of laminations stacked on one another. Each also typically uses a copper conductor. In the case of the stator 72, the ends 84 of the copper windings (representing the copper conductor) wound in slots of the stator 72 are shown in FIG. 2. The stator 72 has an outer or circumferential surface 86 and first and second opposed ends 88, 90. The stator 72 is positioned about the rotor 70. With the rotor 70, the stator 72 defines an air gap 92 between the stator and rotor 70. Construction and operation of the stator 72 and rotor 70 are not shown nor described in detail, as elements of such electrical devices are well known.

An outer wall 94 is positioned about the stator 72. The outer wall 94 is part of an enclosure 96 of the generator 14. The enclosure 96 surrounds the operating parts of the generator 14, including the stator 72 and rotor 70. Preferably, the enclosure 96 provides a relatively air tight compartment. It will be appreciated that the shaft 80 is not fully enclosed in order to connect to engine 16. Seals (not shown) may be used to provide sealing between the rotating shaft 80 and the enclosure 96.

Between the outer wall 94 and the stator 72 is a space or cooling chamber 98. This space 98 extends circumferentially around the stator 72 and is open at the ends 88, 90 of the stator 72 into the enclosure 96. Fins 100 extend outwardly and radially into the cooling chamber 98 and around the circumference of the stator 72. The fins 100 are oriented along axis 74 and extend from the surface 86 of the stator 72. Adjacent fins 100 define spaces 101 between one another. In the circumferential or outer surface 86 of the stator 72 are openings 102 that extend preferably along the axis 74, and thus longitudinally along the outer surface 86. The openings 102 are divided into channels 104 by dividers 106 that extend inwardly and radially into the openings 102. The dividers 106 define adjacent channels (illustrated at 104', 104"). As shown, dividers 106 preferably extend immediately adjacent bottom surfaces 108 of openings 102. They may touch surfaces 108 but do not need to.

In a preferred construction, an outer cap 110 is provided. The outer cap 110 has a wall 112 with an inner circumferential surface 114 of substantially equal diameter to that of the outer surface 86 of stator 72. Fins 100 and dividers 106 are connected to the wall 112, preferably in an integral fashion such as might be accomplished through casting the outer cap 110. The dividers 106 are radially aligned with the fins 100. The dividers 106 are, practically speaking, a part of the fins 100 for purposes to be explained.

For ease of construction, it is contemplated that the outer cap 110 is assembled from a plurality of sections 116 (three shown at 116', 116", 116'"). The sections 116 can be welded one to another to fit about and preferably be positioned in full contact with the surface 86 of the stator 72. The sections 116 can be steel castings or other suitable material for use in the interior environment of the generator 14 (or motor 26, 28) and to facilitate heat transfer, as will be explained later. The stator 72 itself may, in one embodiment, have an outer portion 118 separate from the stator laminations that are built up and wound with copper wire. This outer portion 118 (shown only in FIG. 3) facilitates providing the openings 102 in the outer surface 86 of the stator 72. This is accomplished by constructing the outer portion 118 separately, such as through a steel casting. The openings 102 can be cast into the outer portion 118. The outer portion 118 is preferably constructed of thin annular pieces of similar thickness to the copper wound laminations of the stator 72 that are then press fit to each stator lamination. The thin annular pieces may also be welded to each of the copper wound laminations.

Referring to FIG. 2, an in-flow manifold 120 and out-flow manifold 122 are provided in connection with the channels 104 (not shown in FIG. 2). Each of the manifolds 120, 122 is associated with a respective end 90,88 of stator 72 and extends continuously about that end 90,88. The manifolds 120, 122 are so located as to be in fluid communication with the channels 104 in the stator 72. The in-flow manifold 120 is in fluid connection with input line 48 via a line 123 that extends from the manifold 120 and opens out on housing 64. The out-flow manifold 122 is in fluid connection with output line 50 via a line 124 that extends from the manifold 122 and also opens out on housing 64. Each manifold 120, 122 is formed by a step 125 in the outer circumferential portion of the stator 72 and the outer cap 110. The outer cap 110 has a circular tab 126 (as shown, an extension of thin wall 112) at each end 88, 90 that is fastened, typically by welding, to the outer circumferential portion of the stator 72. This connection is fluid tight to prevent fluid flow from the manifold 120, 122 and channels 104 into the enclosure 96.

Fluid mover 66 includes an impeller 127. The fluid mover 66 is located adjacent the first ends 88, 76 of stator 72 and rotor 70 inside the enclosure 96. The impeller 127 is of typical, known construction and is rotationally coupled to the shaft 80, such as by a press fit. Thus, the impeller 127 rotates with the rotor 70 and will move fluid (air) as it rotates. The impeller 127 is constructed so that it will direct or push air through openings 128 in an interior wall 129 (and into cooling chamber 98) and take air adjacent the gap 92 between the rotor 70 and stator 72. The interior wall 129 and another interior wall 130 adjacent the other ends 90, 78 of the stator 72 and rotor 70 provide structural support for the stator 72. Inner wall 130 also has openings 131 through which fluid may pass through cooling chamber 98 as will be described.

Figure 4:
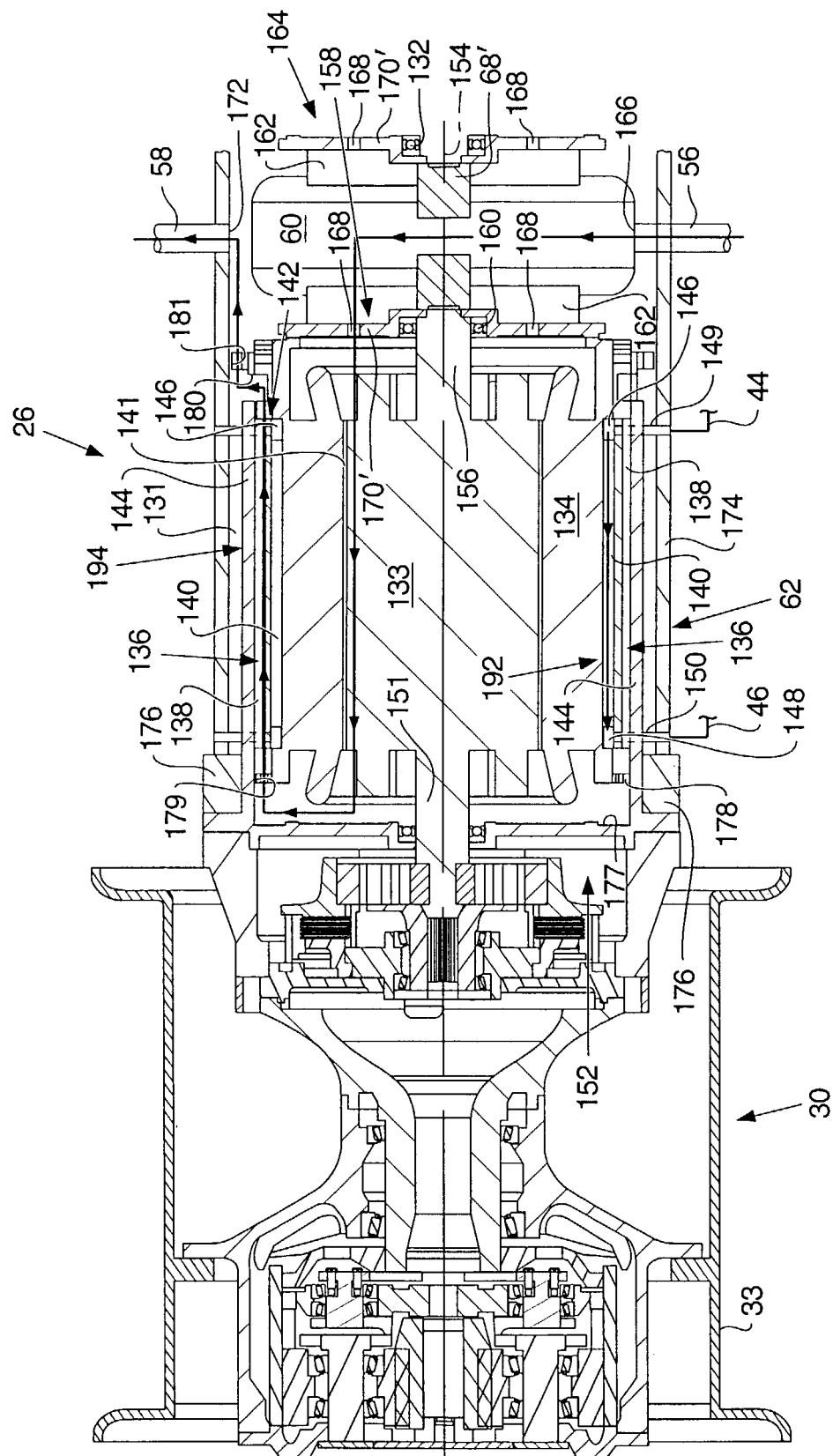
FIG. 4 is a cross-sectional view taken lengthwise through the left side final drive and motor of FIG. 1.

Referring now to FIG. 4, an embodiment in which the electrical device 12 is a motor will be discussed. Shown is the first motor 26 coupled to first final drive 30. The construction of motor 26, as disclosed in FIG. 4, is similar to generator 14. Further, motors 28, 30 are of the same construction. The second motor 28, as will be appreciated from a reference to FIG. 1, is positioned to the right of manifold 60. The sensor 68' and bearing 132 associated with second motor 28 are shown in FIG. 4. The motors 28, 30 and manifold 60 are contained within case or enclosure 62. A space or chamber 131 is defined between the case 62 and the motor 28.

The construction of motors 28, 30 will not be discussed in detail. However, a brief overview of the construction will be made of motor 26 for orientation purposes and to assist in describing some different aspects of motors 26, 28 from generator 14.

Motor 26 has a rotor 133 and stator 134, along with an outer cap 136 with fins 138 and dividers 140. The rotor 133 and stator 134 have a gap 141 between them. A cooling chamber 142 is located between wall 144 and stator 134. In-flow 146 and out-flow 148 manifolds connect with channels (not shown), in part defined by dividers 140. The manifolds 146, 148 connect through the case 62 and wall 144 via internal lines 149, 150 to in-flow and out-flow lines 44, 46, respectively. The construction of channels is the same as the embodiment described with respect to FIGS. 2 and 3. Shaft 151, at a first end 152 of rotor 133, drives final drive 30 as instructed by controller 22. Shaft 151 rotates about axis 154. Another shaft 156, at a second end 158 of rotor 133 rotationally supports the rotor 133 on bearing 160.

Manifold 60 is located adjacent shaft 156. The manifold 60 is connected by structure 162 associated with the second end 158 of motor 26 and a second end 164 of motor 28. The structure 162 can be any sort of bracket or similar arrangement that connects to the ends 158, 164 and supports the manifold 60 to remain in position between the motors 26, 28. Manifold 60 has an opening 166 that fluidly connects with input line 56. Manifold 60 is of generally circular construction and is preferably made of sheet metal or the like. Manifold 60 fluidly communicates through the second ends 158, 164 of motors 26, 28 through one or more openings 168 (two shown) in each end plate 170', 170" associated with a respective end 158, 164 of the motors 26, 28. If additional structure blocks fluid communication between the air manifold 60 and the interior of the motors 26, 28, then similarly additional openings or other types of fluid pathways would be needed.

An opening 172 in a cylindrical wall 174 of case 62 is connected to output line 58 so that the line 58 and the interior space 131 of the case 62 are in fluid communication with line 58. Case 62 provides a generally air tight container in which the motors 26, 28 and manifold 60 reside. It will be appreciated from FIG. 4 that case 62 includes the cylindrical wall 174, flanges 176 and an end wall 177. Shaft 151 extends through end wall 177. Seals (not shown) may be used to facilitate air tightness of case 62 as needed. Additionally, there is an annular interior wall 178 that has openings 179 and that supports the placement of stator 134 within the case 62. At the other end 158 of motor 26 is another annular wall 180 with openings 181.

INDUSTRIAL APPLICABILITY

In operation of a motor or generator, such as illustrated by motors 26, 28 and generator 14, considerable heat occurs in the rotors and stators. The heat must be dissipated or otherwise controlled to optimize operation and increase the life. Through the construction, methods and operation disclosed, cooling is provided to control heat.

In an exemplary method, a step of directing a first flow of fluid adjacent the outer surface 86 of stator 72 occurs. The first flow of fluid occurs along a first circulation pathway 182 shown by arrows in FIG. 2. The fluid in the first flow of fluid is provided from the earlier discussed first source of fluid 34. Thus, it will be seen that fluid (preferably liquid) moved by pump 36 is directed through input line 48 and heat exchanger 42 to generator 14. The fluid passes through line 123 into manifold 120. From manifold 120, the flow is directed into and through the channels 104 that are in the outer surface 86. The fluid flows through the channels 104 and then into manifold 122 and line 124. From line 124, the fluid will flow through output line 50 to return to pump 36. The fluid thus is moved through the first circulation pathway 182 by action of pump 36.

A step of directing a second flow of fluid between the stator 72 and wall 94 also occurs. The second flow of fluid occurs along a second circulation pathway 184 also shown by arrows in FIG. 2. The fluid in the second flow of fluid is provided from the second source of fluid 52. In this example, impeller 127 rotating with the rotor 70 moves the fluid (air in this example). Impeller 127 will typically always rotate when engine 16 is running, so the flow of cooling air will occur continuously. As the rotor 70 turns, impeller 127 directs air flow inside the enclosure 96 through pathway 184. Air is drawn through and from the gap 92 between stator 72 and rotor 70 into a central portion 186 of impeller 127 and then pushed from a top portion 188 through openings 128 and between the spaces 101 between the fins 100. The air continues past the fins 100 and back into an area 190 of enclosure 96. The air further circulates past second end 90 of stator 72 and into the air gap 92 where it continues back to central portion 186 of impeller 127.

A step of transferring heat in the fluid of the second flow of fluid (second circulation pathway 184) to the fluid of the first flow of fluid (first circulation pathway 182) further occurs. It will be appreciated that heat in the rotor 70 and stator 72 will transfer into the air in the enclosure 96 as the air circulates. Further, as the air circulates past fins 100 in cooling chamber 98, a step occurs of transferring heat from the air to the fins 100. Transfer of heat from the fins 100 will then occur to the liquid in the channels 104 (first circulation pathway 184). Heat transfer is enhanced by direct contact of dividers 106 with the liquid. For this reason in the embodiment shown, dividers 106 are shown extending fully into openings 102 to enhance the heat transfer effect. Some heat may also transfer directly from the stator 72 into the liquid. The heat is ultimately dissipated outside the generator 14 by directing it through heat exchanger 42. Thus, a step of blowing air within enclosure 96 occurs in a closed loop, so that air within the enclosure 96 is recirculated.

Cooling motors 26, 28 is similar to that above described. The air circulation pathways do differ, however, and will be described. Referring to FIG. 4, a first circulation pathway 192 is illustrated by arrows. The first circulation pathway 192, for liquid flow in the embodiment shown, includes manifolds 146, 148 and channels (not shown) in stator 134. Liquid enters manifold 146 through line 44 and internal line 149 and then into channels (not shown) associated with stator 134. The liquid will be circulated through the channels toward the opposite manifold 148 and then be drawn out of the motor 26 through line 150 into line 46 and back to pump 36.

A second circulation pathway 194, shown by arrows, is also illustrated in FIG. 4. The pathway 194 includes the manifold 60 that takes air pushed by blower 54 through line 56. The air is directed through openings 168 into gap 141 and then across first end 152 of stator 134. The air passes through openings 179 into cooling chamber 142 and along fins 138 in spaces between fins 138. Air then exits the cooling chamber 142 through openings 181 and into the larger space in case 62. From the case 62, the air is drawn through opening 172 and line 58 back to blower 54 for redistribution. Thus, air distribution for motor 26 (and motor 28) is also closed loop.

Cooling of motor 26 thus occurs by transfer of heat from the rotor 133 and stator 134 to air as flow occurs in the second circulation pathway 194 by manifold 60. The air then flows into cooling chamber 142 where the heat it contains is transferred to fins 138 and hence into the liquid in the first circulation pathway 192. Air manifold 60 similarly distributes air into a circulation pathway (not shown) in the second motor 28. Thus it will be seen that pump 36 and heat exchanger 42 serve both motors 26, 28 for purposes of liquid coolant flow. And the use of the single manifold 60 located between the two motors 26, 28 provides for a compact and efficient packaging arrangement, plus lowers cost by reducing parts.

The heat exchanger 42 and pump 36 further serve to supply generator 14 with liquid coolant flow. This arrangement conserves needed space in the illustrated application, which can be limited on vehicles or work machines. Further, generator 14 and motors 26, 28, may have different heat loads or experience unequal or sub optimum coolant flow in the lines to each. In such an event, it may be desirable to regulate flow from the pump 36 to each by using one or more flow regulators (not shown). In such case, the appropriate amount of flow can be directed to each electrical device 12 as needed or required.

Further, the motor 26 (and motor 28) does not always operate. This means rotor 133 does not always rotate, providing flow of air for cooling purposes, as is typical with generator 14. Even so, motor 26 will benefit from constant air flow for cooling purposes, because of the high loads on the motor 26. The blower 54 can provide a continuous flow of air, because it can be operated by electrical power independently of the rotor 133.

The use of closed loops with "air tight" cases or housings for cooling eliminates (or at least significantly eliminates) use of outside air in cooling. Outside air, in the environments in which some generators or motors operate, can contain contaminants that will reduce the effectiveness of the electrical device. For example, for an off-highway truck or other earthmover, the air may carry dust or dirt that might clog the circulation pathways 184, 194 and cause the electrical devices 12 to fail. The liquid cooling in the first circulation pathways 182, 192 facilitates the closed loop operation by providing a heat transfer mechanism to remove heat from the interiors of generator 14 and motor 26, 28.

The embodiments illustrated above and in the drawings have been shown by way of example. There is no intent to limit the invention to the exemplary forms disclosed. All modifications, equivalents and alternatives falling within scope of the appended claims are intended to be covered.

What is claimed is:

1. An electrical device, comprising:
a rotor having an axis and being rotatable about the axis;
a stator having a circumferential surface, being positioned about the rotor and defining with the rotor a gap between the stator and rotor;
an outer wall positioned about the stator and defining with the stator a cooling chamber between the outer wall and stator;
a first source of fluid;
a first circulation pathway for fluid from the first source of fluid defined adjacent the circumferential surface of the stator; wherein the first circulation pathway includes flow through channels in the stator adjacent the circumferential surface of the stator and oriented along the axis of the rotor;
a second source of fluid; and
a second circulation pathway for fluid from the second source of fluid defined through the gap and through the cooling chamber.

2. The electrical device of claim 1 further including
fins positioned in the cooling chamber and oriented along the axis of the rotor, adjacent fins defining spaces there between; and
wherein the second circulation pathway includes the spaces between the fins.

3. The electrical device of claim 2 wherein the fins extend from the circumferential surface of the stator into the cooling chamber.

4. The electrical device of claim 1 wherein the stator has openings in the circumferential surface; and
further including
an outer cap positioned about the stator and having fins and dividers, the fins extending outwardly into the cooling chamber, the dividers extending inwardly into the openings in the circumferential surface and dividing the openings into the channels in the stator.

5. The electrical device of claim 4 wherein
the outer cap has a wall positioned in contact with the circumferential surface of the stator;
the fins are connected to the wall; and
the dividers are connected to the wall and radially aligned with the fins.

6. The electrical device of claim 4 wherein the dividers are part of the fins.

7. The electrical device of claim 1 wherein the first source of fluid includes a fluid pump and a line from the pump for directing the fluid to the first circulation pathway.

8. The electrical device of claim 1 wherein the fluid of the first source of fluid is a liquid.

9. The electrical device of claim 1 wherein the second source of fluid includes a blower and the fluid of the second source of fluid is air.

10. The electrical device of claim 1 further including
an outer enclosure defining an airtight compartment in which the rotor and stator are positioned; and
wherein the second source of fluid and the second circulation pathway are contained within the outer enclosure.

11. The electrical device of claim 8 wherein the second source of fluid includes a blower and the fluid of the second source of fluid is air.

12. An electrical device, comprising:
a rotor having an axis and being rotatable about the axis;
a stator having a circumferential surface, being positioned about the rotor and defining with the rotor a gap between the stator and rotor;
an outer wall positioned about the stator and defining with the stator a cooling chamber between the outer wall and stator;
a first source of fluid;
a first circulation pathway for fluid from the first source of fluid defined adjacent the circumferential surface of the stator; wherein the first circulation pathway includes flow through channels in the stator adjacent the circumferential surface of the stator and oriented along the axis of the rotor;
a second source of fluid; and
a second circulation pathway for fluid from the second source of fluid defined through the gap and through the cooling chamber;
wherein the first circulation pathway is fluidly isolated from the second circulation pathway.

13. The electrical device of claim 12 further including
fins positioned in the cooling chamber and oriented along the axis of the rotor, adjacent fins defining spaces there between; and
wherein the second circulation pathway includes the spaces between the fins.

14. The electrical device of claim 13 wherein the fins extend from the circumferential surface of the stator into the cooling chamber.

15. The electrical device of claim 12 wherein the fluid of the first source of fluid is a liquid.

16. The electrical device of claim 12 wherein the second source of fluid is air.

17. The electrical device of claim 15 wherein the second source of fluid is a gas.

* * * * *